United States Patent
Dallyn et al.

(10) Patent No.: US 10,076,776 B2
(45) Date of Patent: Sep. 18, 2018

(54) DISSOLVED PHASE CONTAMINANT RECOVERY SYSTEM AND METHOD FOR USING SAME

(71) Applicant: North Shore Environmental Consultants Inc., Sherwood Park (CA)

(72) Inventors: Sherree Dallyn, Edmonton (CA); Murphy Calvin, Leduc (CA)

(73) Assignee: North Shore Environmental Consultants Inc., Sherwood Park, CA (US)

( * ) Notice: Subject to any disclaimer, the term of this patent is extended or adjusted under 35 U.S.C. 154(b) by 219 days.

(21) Appl. No.: 14/939,620

(22) Filed: Nov. 12, 2015

(65) Prior Publication Data
US 2016/0151813 A1    Jun. 2, 2016

Related U.S. Application Data

(60) Provisional application No. 62/079,705, filed on Nov. 14, 2014.

(51) Int. Cl.
*B09C 1/00* (2006.01)
*B09C 1/02* (2006.01)

(52) U.S. Cl.
CPC ..................... *B09C 1/02* (2013.01)

(58) Field of Classification Search
CPC ......................................... B09C 1/02
See application file for complete search history.

(56) References Cited

U.S. PATENT DOCUMENTS

| | | | | |
|---|---|---|---|---|
| 4,435,292 A | * | 3/1984 | Kirk | B09C 1/00 210/747.7 |
| 4,582,611 A | * | 4/1986 | Wang | B01D 29/15 210/170.07 |
| 4,755,304 A | * | 7/1988 | Hallberg | C02F 1/645 210/611 |
| 5,380,125 A | * | 1/1995 | Croy | B09C 1/005 166/267 |
| 5,655,852 A | | 8/1997 | Duffney et al. | |
| 5,846,434 A | * | 12/1998 | Seaman | C02F 1/547 210/724 |
| 6,379,083 B1 | * | 4/2002 | Maeda | B09C 1/02 405/128.2 |
| 2010/0150657 A1 | * | 6/2010 | Ball | B09C 1/002 405/128.5 |

FOREIGN PATENT DOCUMENTS

CA    1226515    9/1987

OTHER PUBLICATIONS

Canada Notice of Allowance dated Mar. 5, 2018 in corresponding Application No. CA2911791 filed Nov. 10, 2015 (1 page).
Canada Office Action dated Aug. 14, 2017 in related CA Application 2911791 filed Nov. 10, 2015 (7 pages).

* cited by examiner

*Primary Examiner* — John J Kreck
(74) *Attorney, Agent, or Firm* — Dentons US LLP; Brian R. McGinley; Roman Tsibulevskiy

(57) ABSTRACT

A dissolved phase contaminant recovery system is provided that can recover water contaminated with dissolved phase contaminants from regions of organic or coarse-grained soil. The system includes injection wells placed in the region for injecting uncontaminated water into the soil, and recovery wells placed for recovering water contaminated with dissolved phase contaminants, the recovery wells placed proximal to the injection wells.

5 Claims, 16 Drawing Sheets

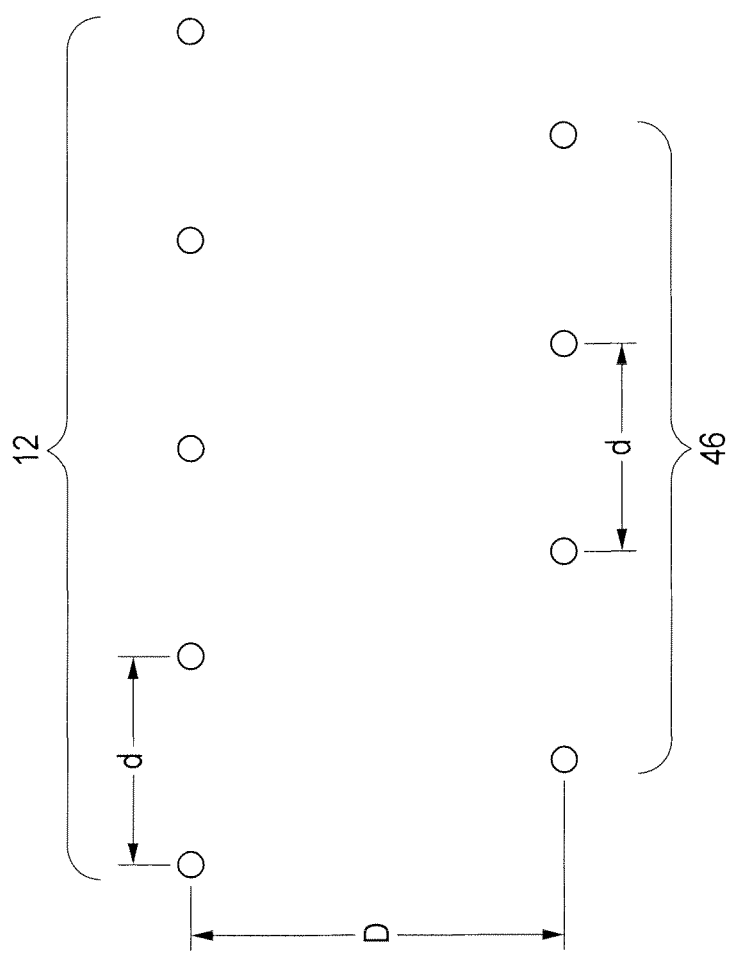

DISSOLVED PHASE CONTAMINANT RECOVERY SYSTEM AND METHOD FOR USING SAME

CROSS-REFERENCE TO RELATED APPLICATIONS

This application claims priority of U.S. provisional patent application Ser. No. 62/079,705 filed Nov. 14, 2014, which is incorporated by reference into this application in its entirety.

TECHNICAL FIELD

The present disclosure is related to the field of dissolved phase contaminant recovery systems for remediating contaminated soil, in particular, organic or other coarse-grained soils.

BACKGROUND

Activities and occurrences such as the drilling of wells, pipeline failures or breaks, surface well blowouts, tanker truck roll-overs and other industrial activities can produce areas contaminated with foreign products such as hydrocarbons, produced water or with other chemicals, or contaminate existing areas surrounding these activities including, but not limited to, areas comprising organic and coarse-grain soil.

It is, therefore, desirable to provide a dissolved phase contaminant recovery system for use in remediating organic soil or coarse-grained soil that is contaminated with dissolved phase contaminants.

SUMMARY

A Dissolved Phase Contaminant Recovery System ("DPCRS") is provided that can direct dissolved phase contaminants to recovery locations. The system can be based on strategic injection points that can manipulate zones of saturation, flow pressures and volumes to direct dissolved phase contaminants towards recovery points. The DPCRS can provide a low impact alternative to conventional remediation methods for removing contaminants from areas comprising organic and coarse-grain soils including, but not limited to, ecologically sensitive areas. The DPCRS can comprise an in-situ system that can remove dissolved phase contaminates from areas typically inundated with water, areas where water is trapped in vegetation, and areas where organic or other coarse grained soil (such as gravel or sand) are saturated. The timeframe and ecological footprint for contaminant recovery using the DPCRS is generally reduced compared to existing groundwater remediation systems.

In some embodiments, the DPCRS can comprise of two main components: injection points and recovery points.

Clean water (or with other components or compositions, as required) can be added to the impacted area through injection wells. The location of the injection wells can be dependent on the contaminants, the hydrogeology, the hydrology and other site-specific conditions. The water can be injected at various depths to ensure proper saturation of the impacted zone creating a flow to recovery points. Screen intervals can be added throughout the soil profile at selected depths. The pressure of injection can be dependent on the soil type, texture and stratigraphy. For example, less pressure is generally required in organic soil or coarse grained soil such as sand. Pressures can be adjusted to prevent the soil from fracturing, which would cause direct pathways to recovery points reducing the effectiveness of the system. The volume of flow through the injection system can also be controlled to ensure the optimal saturation level is achieved to mobilize contaminants to recovery points. The volume can be controlled through the use of manifold systems where injection well volumes can be turned up or down and on or off. The direction of flow can also be controlled through the placement of the injection points within the area of concern, and the placement of the recovery points.

The recovery points can be established within the affected area to collect from the highest level of impact based on field measurements and laboratory data. The location and depth of screen for each recovery point can be dependent on the site specific conditions, the contaminant plume and the injection locations.

Typically, the "hot spots" of contaminants are the focus of the recovery points. The injection points can be established at the lateral extents of the impact area. As the impact zone is reduced, the injection points can be moved to continue to direct the contaminants to the recovery points.

In some embodiments, clean water can be drawn from a tank, pumped at selected pressure into a manifold where it can be dispersed into a series of injection wells. The water flow and pressure of the water can be controlled at the manifold and at each of the injection wells. The number of injection wells on a manifold can be dependent on site specific conditions. These may include contaminant plume, seasons, subsurface water flow, soil, wetland or ecosystem type, surface water flow, stratigraphy and gradient.

Broadly stated, in some embodiments, a dissolved phase contaminant recovery system can be provided for recovering dissolved phase contaminants from a permeable layer of soil, the system comprising: a plurality of injection wells configured to be inserted into the permeable layer of soil, the plurality of injections wells further configured to inject water into the permeable layer of soil; and a plurality of recovery wells configured to be inserted into the permeable layer of soil, the plurality of recovery wells further configured to withdraw at least some dissolved phase contaminants from the permeable layer of soil.

Broadly stated, in some embodiments, a method can be provided for recovering dissolved phase contaminants from a permeable layer of soil contaminated with the dissolved phase contaminants, the method comprising the steps of: providing dissolved phase contaminant recovery system, the system comprising: a plurality of injection wells configured to be inserted into the permeable layer of soil, the plurality of injections wells further configured to inject water into the permeable layer of soil, and a plurality of recovery wells configured to be inserted into the permeable layer of soil, the plurality of recovery wells further configured to withdraw at least some dissolved phase contaminants from the permeable layer of soil; inserting at least one of the plurality of injection wells into the permeable layer of soil; inserting at least one of the plurality of recovery wells into the permeable layer of soil in a location proximal to the inserted at least one of the plurality of injection wells; injecting pressurized water into the permeable layer soil through the inserted at least one of the plurality of injections wells; and recovering water contaminated with dissolved phase contaminants from the inserted at least one of the plurality of recovery wells.

Broadly stated, in some embodiments, the dissolved phase contaminant recovery system can further comprise: a tank configured for holding uncontaminated water; a first water pump operatively coupled to the tank, and configured to draw the water from the tank and to provide a source of pressurized water; and a manifold operatively coupling the source of pressurized water to the plurality of injection wells.

Broadly stated, in some embodiments, at least one of the plurality of injection wells can comprise: a tubular probe comprising an upper end and a lower end; an upper cap disposed on the upper end and configured for enclosing the upper end; a coupler disposed on the upper cap, the coupler configured for coupling to the manifold via a hose; a pressure gauge operatively coupled to the upper cap, the pressure gauge configured for measuring pressure of the source of pressurized water pumped by the first water pump; and at least one screen disposed on the tubular probe, the at least one screen configured to permit water pumped by the water pump to egress through the at least one screen into the permeable layer of soil.

Broadly stated, in some embodiments, at least one of the plurality of recovery wells can comprise: a well tube comprising an open upper end and an open lower end; a collection hose having a first end and a second end, the first end disposed in the well tube and configured to draw in contaminated water comprising dissolved phase contaminants entering into the well tube; a second water pump comprising an inlet and a discharge port, the inlet operatively coupled to the first end of the collection hose, the second water pump configured for pumping the contaminated from the well tube and out the discharge port; and a holding tank configured to receive dissolved phase contaminated water discharged from the discharge port of the second water pump.

Broadly stated, in some embodiments, a method can be provided for recovering dissolved phase contaminants from a geographic region comprising a permeable layer of soil contaminated with the dissolved phase contaminants, the method comprising the steps of: injecting uncontaminated water into at least one first location in the region, the water injected into at least one first predetermined depth in the permeable layer of soil; and recovering water contaminated with the dissolved phase contaminants from at least one second location in the region, the contaminated water recovered from at least one second predetermined depth in the permeable layer of soil, the at least one second location proximal to the at least one first location.

Broadly stated, in some embodiments, a system can be provided for recovering dissolved phase contaminants from a geographic region comprising a permeable layer of soil contaminated with the dissolved phase contaminants, the system comprising: means for injecting uncontaminated water into at least one first location in the region, the water injected into at least one first predetermined depth in the permeable layer of soil; and means for recovering water contaminated with the dissolved phase contaminants from at least one second location in the region, the contaminated water recovered from at least one second predetermined depth in the permeable layer of soil, the at least one second location proximal to the at least one first location.

BRIEF DESCRIPTION OF THE DRAWINGS

FIG. 16 is a top plan view depicting the placement of injection wells and recovery wells at a field trial site.

DETAILED DESCRIPTION OF EMBODIMENTS

Figure 1:
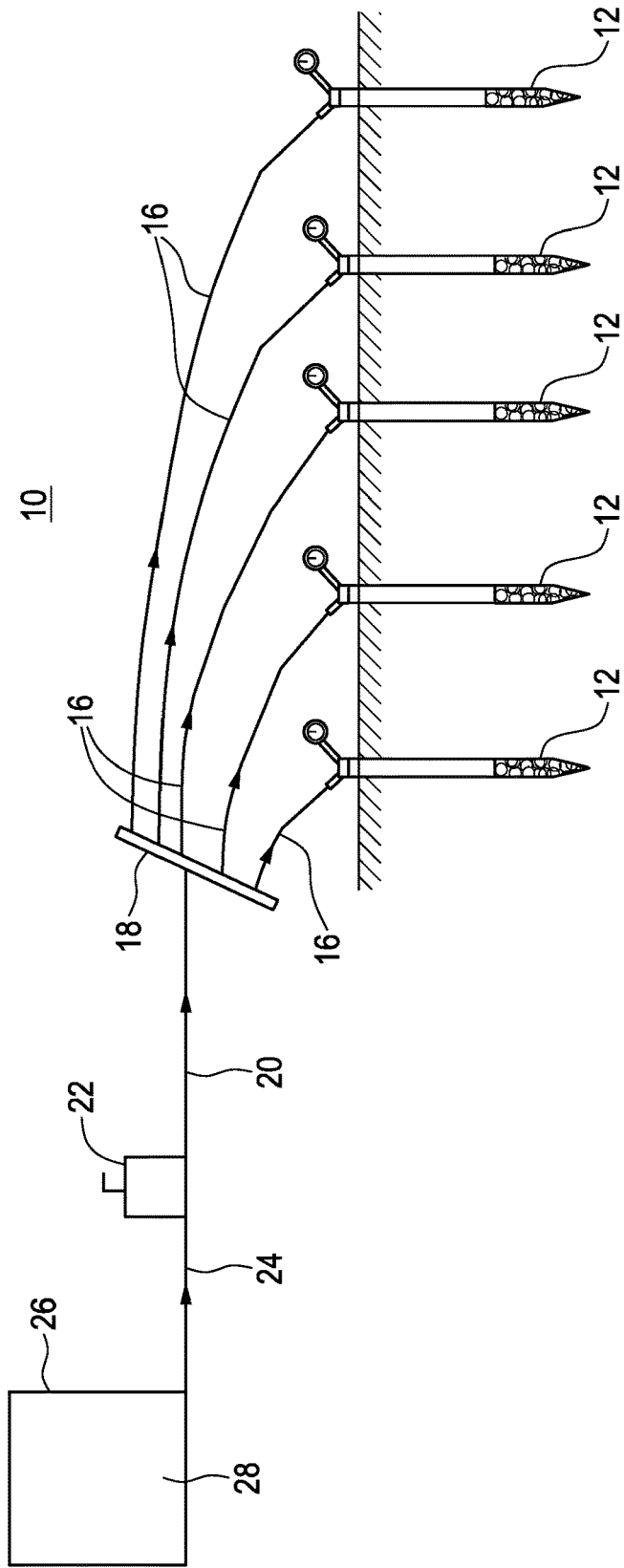
FIG. 1 is a block diagram depicting one embodiment of a dissolved phase contaminant recovery system.

A dissolved phase contaminant recovery system that can direct dissolved phase contaminants to recovery locations, and a method for using same, is provided. In areas where drilling of wells is taking place, in particular, the drilling of hydrocarbon producing wells, and as a result of other activities and occurrences such as pipeline breaks, surface well blowouts, tanker truck roll-overs and other industrial activities, surrounding water systems can become contaminated with chemicals, such as chloride-impacted water that is heavier than uncontaminated water, or contaminated with hydrocarbons that are lighter than uncontaminated water. The soil in these areas can comprise a layer of permeable soil overlaid on top of a layer of impermeable soil.

For the purposes of this description and the claims herein, the term "permeable soil" is defined as including sand, gravel and organic soil. The term "organic soil" is defined as including root vegetation, bogs, peat lands, fen, "muskeg" and wetlands. The term "impermeable soil" is defined as including clay, marl, fine-textured soils and bedrock.

In some embodiments, the dissolved phase contaminant recovery system can comprise two main components: injection points and recovery points. Clean, uncontaminated water can be added to a contaminated or impacted region of soil through injection wells. The location of the injection wells can be dependent on the contaminants, the hydrogeology, hydrology and other site specific conditions. The clean water can be injected at various depths to ensure proper saturation of the impacted zone creating a current to recovery points. Screen intervals can be added throughout the soil profile at selected depths. The pressure of the injected water can be dependent on the soil type, texture and stratigraphy. For example, less pressure is generally required in organic soil or coarse grained soil such as sand. Pressures can be adjusted to prevent the soil from fracturing which would cause direct pathways for the injected water through the soil to flow directly to the recovery points thereby reducing the effectiveness of the system. The volume of flow through the injection system can also be controlled to ensure the optimal saturation level is achieved to mobilize contaminants to recovery points. The volume can be controlled through the use of manifold systems where injection well volumes can be turned up or down, as well as on or off. The direction of flow can also be controlled through the placement of the injection points within the area of concern, and through the placement of the recovery points or wells in the impacted region of soil.

The recovery points are established within the affected area to collect from the highest level of impact based on field measurements and laboratory data. The location and depth of screen for each recovery point is dependent on the site specific conditions, the contaminant plume, and the injection locations. In some embodiments, a single screen can be used at a predetermined depth whereas in other embodiment, multiple screens can be placed at various depths as required for the site.

Typically, the "hot spots" of contaminants are the focus of the recovery points. The injection points can be established at the lateral extents of the impact area. As the impact zone is reduced, the injection points can be moved to continue to direct the contaminants to the recovery points.

In some embodiments, clean, uncontaminated water can come from a tank, pumped at a selected or predetermined pressure into a manifold where it can be dispersed or distributed into a series of injection wells. In some embodiments, the water flow and pressure can be controlled at the manifold, and/or at each of the injection wells. The number of injection wells on a manifold can be dependent on site specific conditions. The conditions can include, without limitation, contaminant plume, seasons, subsurface water flow, soil, wetland or ecosystem type, surface water flow, stratigraphy and gradient.

Referring to FIG. 1, one embodiment of dissolved phase contaminant recovery system 10 is shown. In some embodiments, system 10 can comprise a plurality of injection wells 12 inserted into region of contaminated soil 14. In some embodiments, the plurality of injection wells 12 can be placed in soil 14 in a linear, spaced-apart configuration. In other embodiments, injection wells 12 can be placed in soil 14 in a two-dimensional array or grid pattern. In some embodiments, injection wells 12 can be a distance apart ranging anywhere from 1 meter to 10 meters. In other embodiments, injection wells 12 can be spaced apart a distance ranging from 2 meters to 5 meters. In some embodiments, injection wells 12 can be inserted into soil 14 at a depth ranging anywhere from impermeable layer 34 to the surface of ground 14. In some embodiments, holes for injection wells 12 can be hand-augured to determine the depth to impermeable layer 34. In so doing, soil can be removed from the hole and inspected to determine the depth(s) where contaminants exist in organic soil layer 32, and to determine what type of contaminants are present. In operation, injection wells 12 can be placed first at the lowest depth where contaminants are present and as contaminants are removed, injection wells 12 can then be placed progressively higher up in the holes, approaching the surface of ground 14, until the whole of the contaminated zone in organic soil layer 32 has been treated.

Pressurized uncontaminated water can be injected into soil 14 through injection wells 12. In some embodiments, uncontaminated water 28 can be stored in water tank 26 to supply water pump 22 via hose or pipe 24. Pump 26 can discharge pressurized uncontaminated water 28 through feeder hose or line 20 to manifold 18, where pressurized uncontaminated water 28 can be distributed to injection wells 12 via distribution hoses or lines 16.

Figure 2:
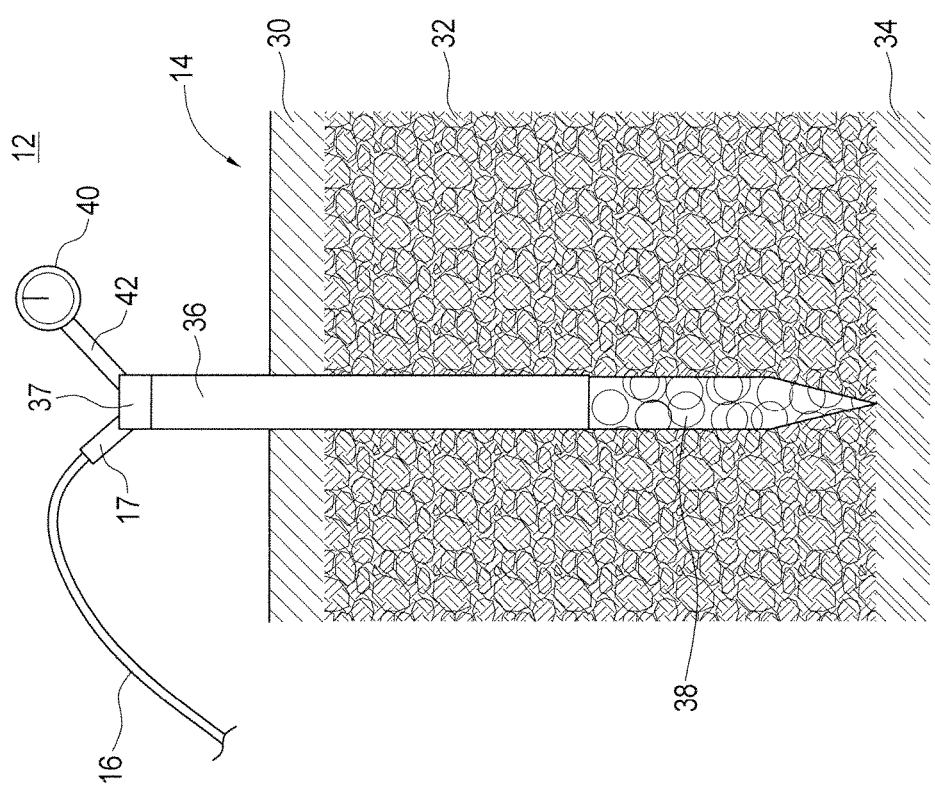
FIG. 2 is a side elevation view depicting an injection of the dissolved phase contaminant recovery system of FIG. 1.

Referring to FIG. 2, an embodiment of injection well 12 is shown. In some embodiments, injection well 12 can comprise hollow and tubular probe 36, which can further comprise a tapered lower end to facilitate easier insertion into soil 14. In some embodiments, probe 36 can comprise an axial passageway disposed therethrough, whose inside diameter can be approximately ½", although any suitable inside diameter can be used, as obvious to those skilled in the art. In some embodiments, injection well 12 can comprise cap 37 disposed on top of probe 36 to enclose the upper end thereof. In further embodiments, cap 37 can comprise coupling 17 to enable communication from hose 16 to probe 36. In yet further embodiments, cap 37 can comprise pressure gauge 40 operatively coupled thereto via tube 42 to enable the measurement of pressure of water being pumped into injection well 12.

In some embodiments, soil 14 can comprise a topsoil layer 30 disposed on top of organic soil layer 32, which can be further disposed on top of impermeable soil layer 34. In the illustrated embodiment, probe 36 can be inserted into organic soil layer 32 until probe 36 reaches impermeable soil layer 38, although it is obvious to those skilled in the art that probe 36 can be to any depth within organic soil layer 32 as necessary to recover dissolved phase contaminants. In some embodiments, probe 36 can comprise screen 38 disposed at a lower end thereof to enable water pumped into injection well 12 to egress through screen 38 into organic soil layer 32. In other embodiments, screen 38 can disposed at any position along the length of probe 36 as required to inject water into the strata within organic soil layer 32 containing contaminants. In other embodiments, probe 36 comprise two or more screens 38 disposed thereon as required along the length of probe 36 to recover dissolved phase contaminants in organic soil layer 32.

Figure 3:
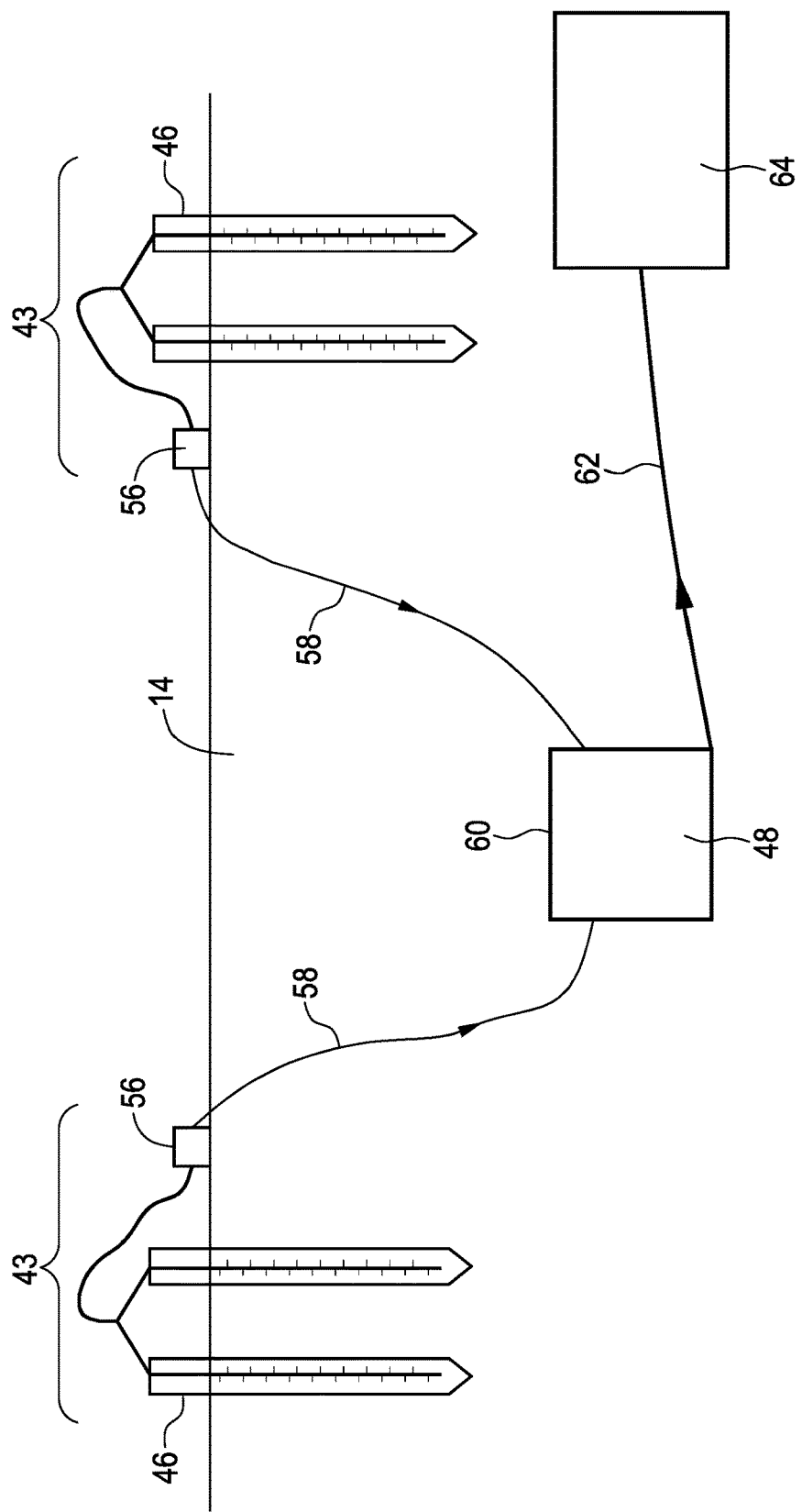
FIG. 3 is a block diagram depicting a recovery well system for use with the dissolved phase contaminant recovery system of FIG. 1.
Figure 4:
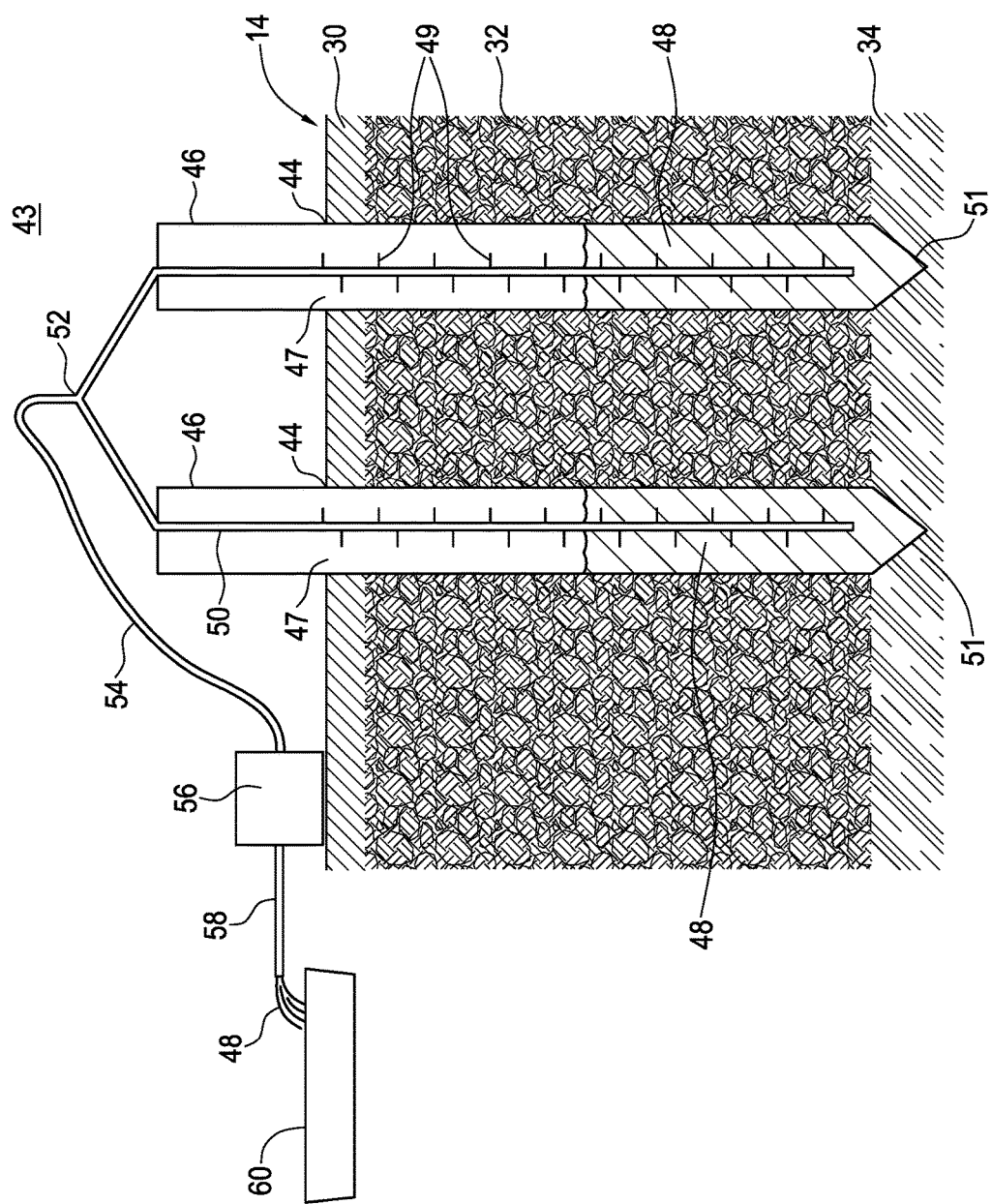
FIG. 4 is a side elevation view depicting a recovery well of the recovery well system of FIG. 3.

Referring to FIGS. 3 and 4, an embodiment of recovery well subsystem 43 is shown. In FIG. 3, two recovery well subsystems 43 are shown operatively connected to recovery tank 60. Each recovery well subsystem 43 can comprise one or more recovery well tubes 46 that are configured to be inserted into recovery wells 44 disposed in soil 14. Each well tube 46 can be tubular thus defining passageway 47 extending from an upper end to a lower end thereof, and can further comprise hose 50 disposed in passageway 47 wherein hose 50 is configured to draw in contaminated water, water that contains dissolved phase contaminants, shown as reference numeral 48. In some embodiments, well tubes 46 can comprise a plurality of slits or holes 49 disposed through the sidewalls of well tubes 46 to enable communication between soil 14 and passageway 47 and allow the ingress of recovered water 48. In some embodiments, slits or holes 49 can comprise a width or diameter of approximately 0.002", as the case may be. In some embodiments, the lower ends of well tubes 46 can be with point end caps 51 to enable manual insertion of well tubes 46 into soil 14. In some embodiments, well tubes 46 can comprise pieces of 4" PVC pipe or any other functionally equivalent piping, as well known to those skilled in the art. In some embodiments, well tubes 46 can be inserted into soil 14 at a depth ranging anywhere from impermeable layer 34 to the surface of ground 14. In some embodiments, holes for well tubes 46 can be hand-augured to determine the depth to impermeable layer 34. In so doing, soil can be removed from the hole and inspected to determine the depth(s) where contaminants exist in organic soil layer 32, and to determine what type of contaminants are present. In operation, well tubes 46 can be placed first at the lowest depth where contaminants are present and as contaminants are removed, well tubes 46 can then be placed progressively higher up in the holes, approaching the surface of ground 14, until the whole of the contaminated zone in organic soil layer 32 has been treated.

In some embodiments, system 10 can comprise a plurality of well tubes 46 inserted into soil 14. In some embodiments, the plurality of well tubes 46 can be placed in soil 14 in a linear, spaced-apart configuration. In other embodiments, well tubes 46 can be placed in soil 14 in a two-dimensional array or grid pattern. In some embodiments, well tubes 46 can be a distance apart ranging anywhere from 1 meter to 10 meters. In other embodiments, well tubes 46 can be spaced apart a distance ranging from 2 meters to 5 meters.

In the illustrated embodiment, recovery well subsystem 43 is shown with two well tubes 46 and two hoses 50 connected together at coupler 52 that is connected to water pump 56 via hose 54. Coupler 52 can comprise a "Y" or "tee" hose fitting, as well known to those skilled in the art, or can comprise a manifold to couple three or more well tubes 46 and hoses 50 together. It should be obvious that if a single well tube 46 and hose 50 are implemented, hose 50 can couple directly to pump 56. Contaminated water 48 that collects in well tubes 46 can be drawn by pump 56 via hoses 54 and 50, and then pumped into holding tank 60 via discharge hose 58. In some embodiments, contaminated water 48 can be further pumped from holding tank 60 via hose 62 to contaminated water disposal or treatment system 64, as well known to those skilled in the art.

Figure 5:
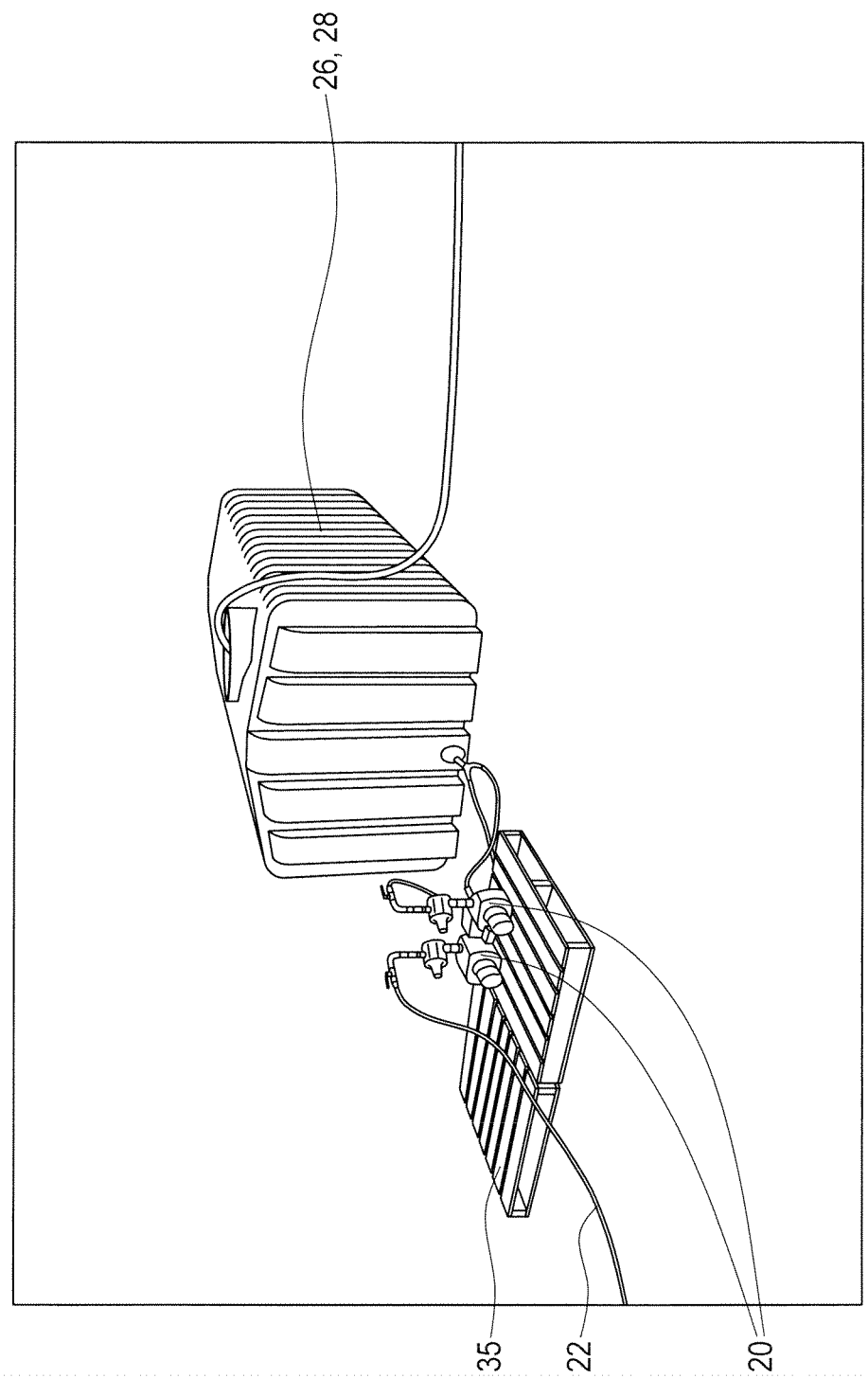
FIG. 5 is a perspective view depicting a clean water tank and injection pumps for use with the dissolved phase contaminant recovery system of FIG. 1.
Figure 6:
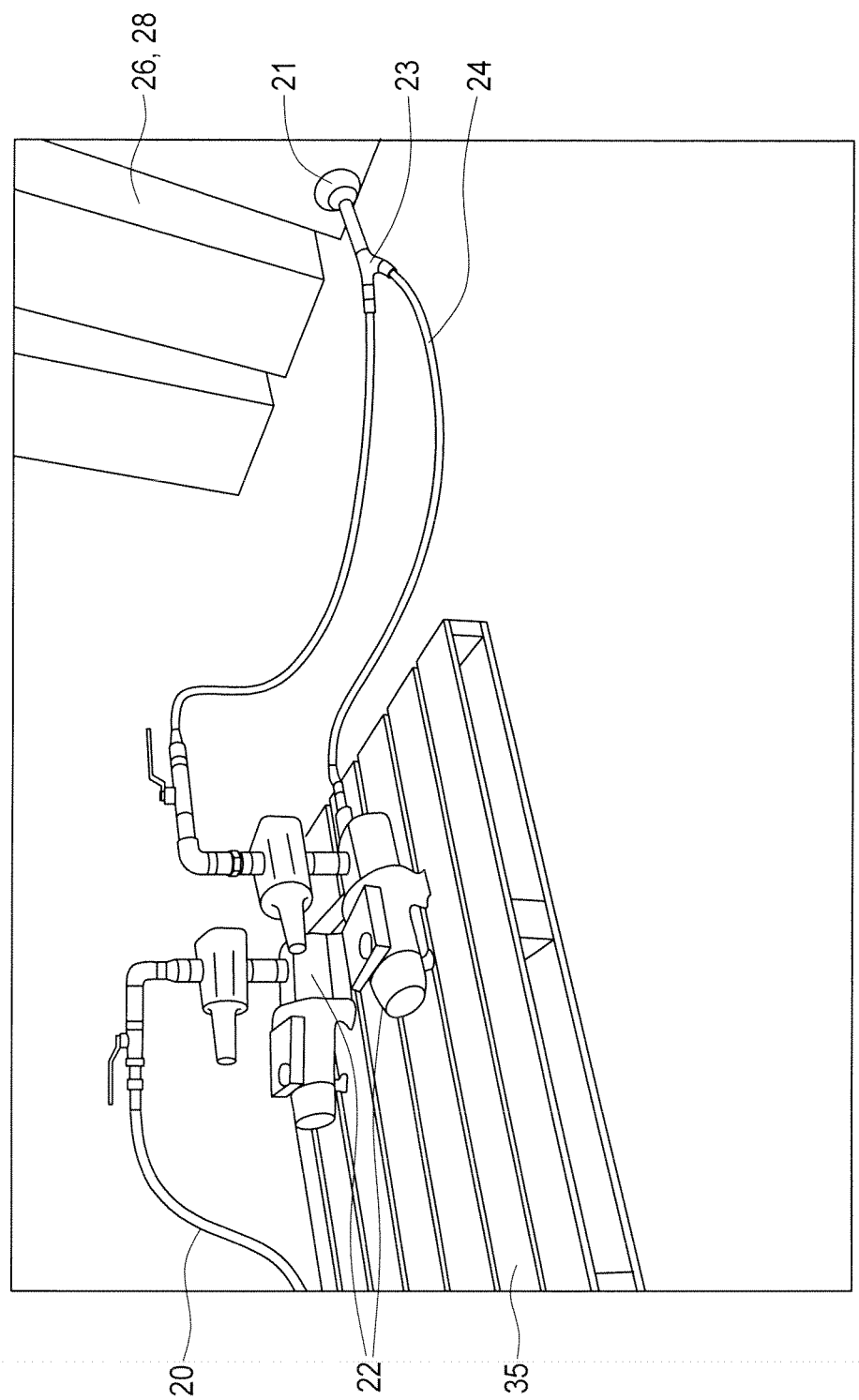
FIG. 6 is a perspective view depicting the injections pumps of FIG. 5.

Referring to FIGS. 5 and 6, representative embodiments of water tank 26 and water pumps 22 are shown. In this embodiment, two water pumps 22 are shown receiving uncontaminated water 28 disposed in water tank 26 via hoses 24 connected to Y-fitting 23 attached to coupler 21 disposed on water tank 26 to provide communication thereto. In some embodiments, mat 35 can be used to provide support means on soil 14 for water pumps 22 and other equipment of system 10 to reduce the environment impact of placing system 10 and its components on soil 14. In some embodiments, mat 35 can comprise one or more conventional wooden shipping pallets, as well known to those skilled in the art.

Figure 7:
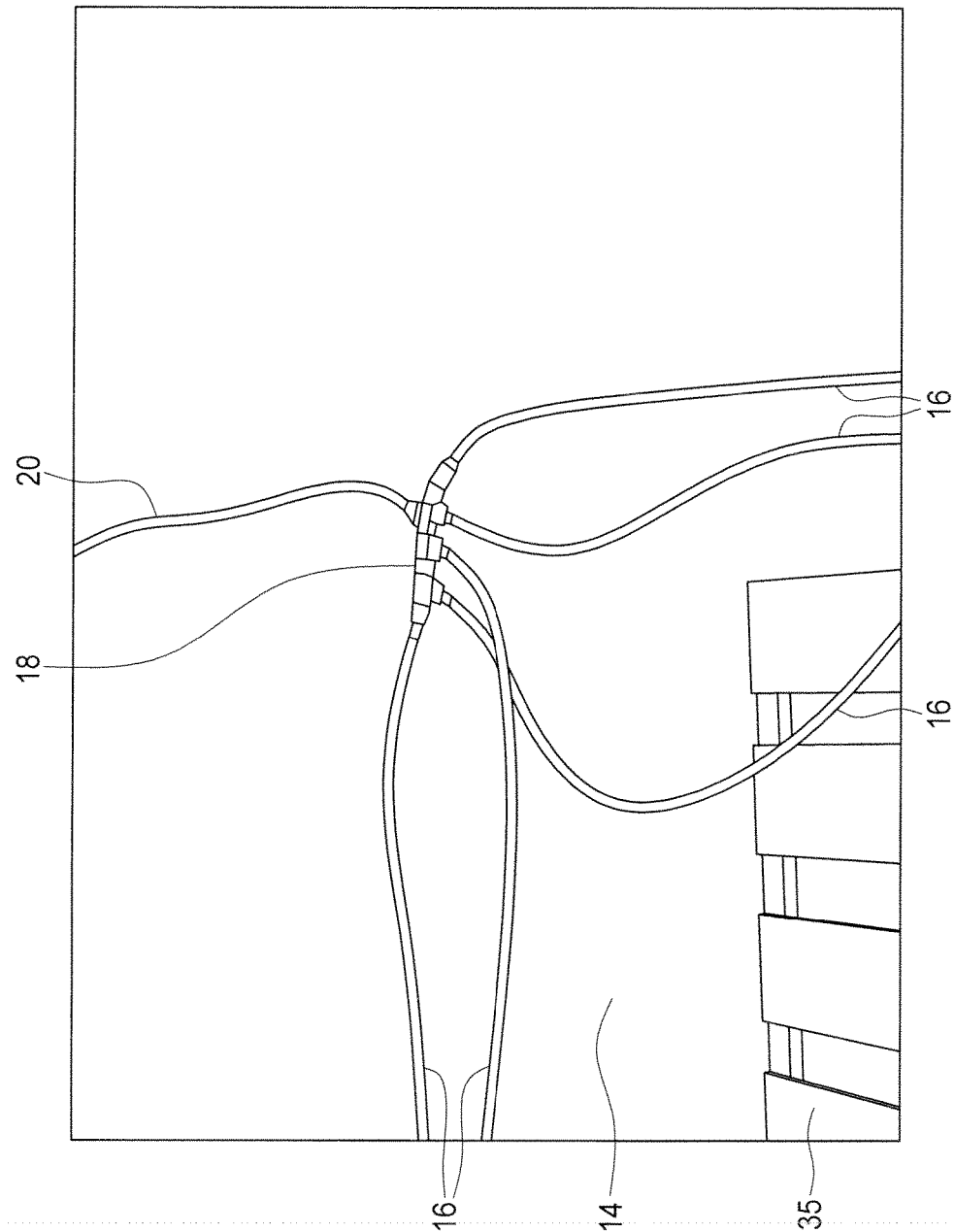
FIG. 7 is a perspective view depicting an injection manifold for use with the dissolved phase contaminant recovery system of FIG. 1.

Referring to FIG. 7, a representative embodiment of manifold 18 is shown receiving water from feeder hose 20, and then distributing the water through five distribution hoses 16.

Figure 8:
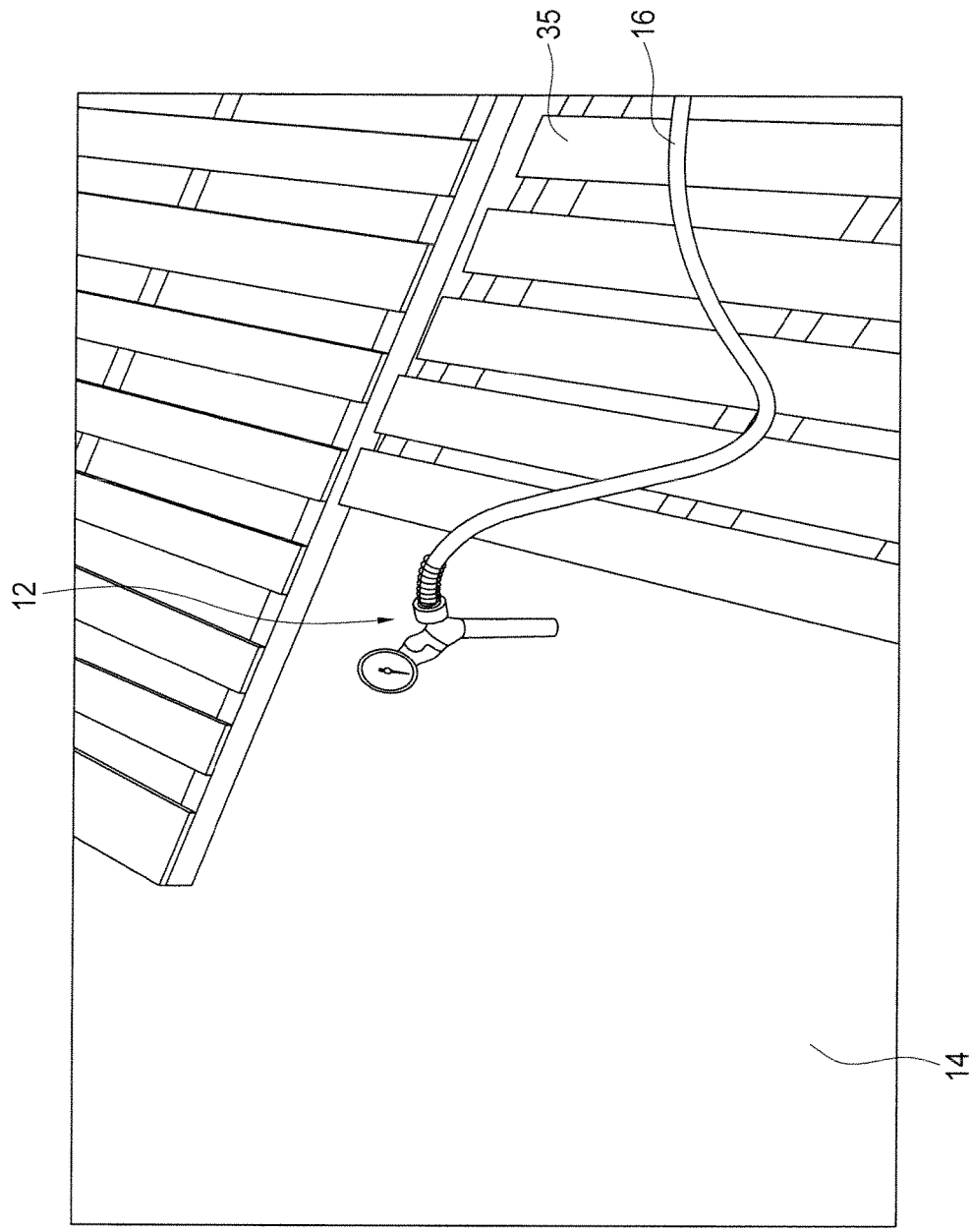
FIG. 8 is a perspective view depicting an injection well for use with the dissolved phase contaminant recovery system of FIG. 1.
Figure 9:
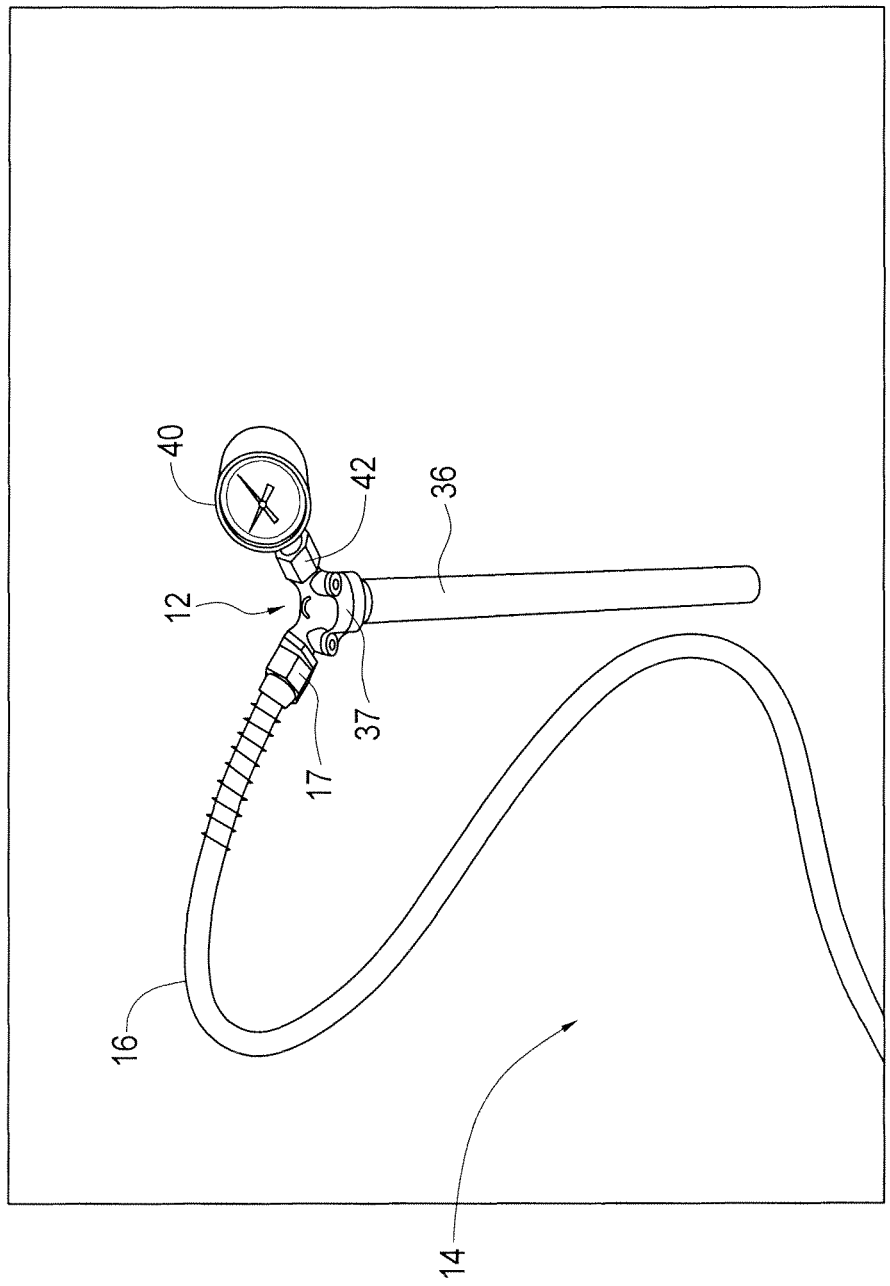
FIG. 9 is a close-up perspective view depicting the injection well of FIG. 8.

Referring to FIGS. 8 and 9, a representative embodiment of injection well 12 is shown inserted into soil 14, with distribution hose 16 connected to injection well 12.

Figure 10:
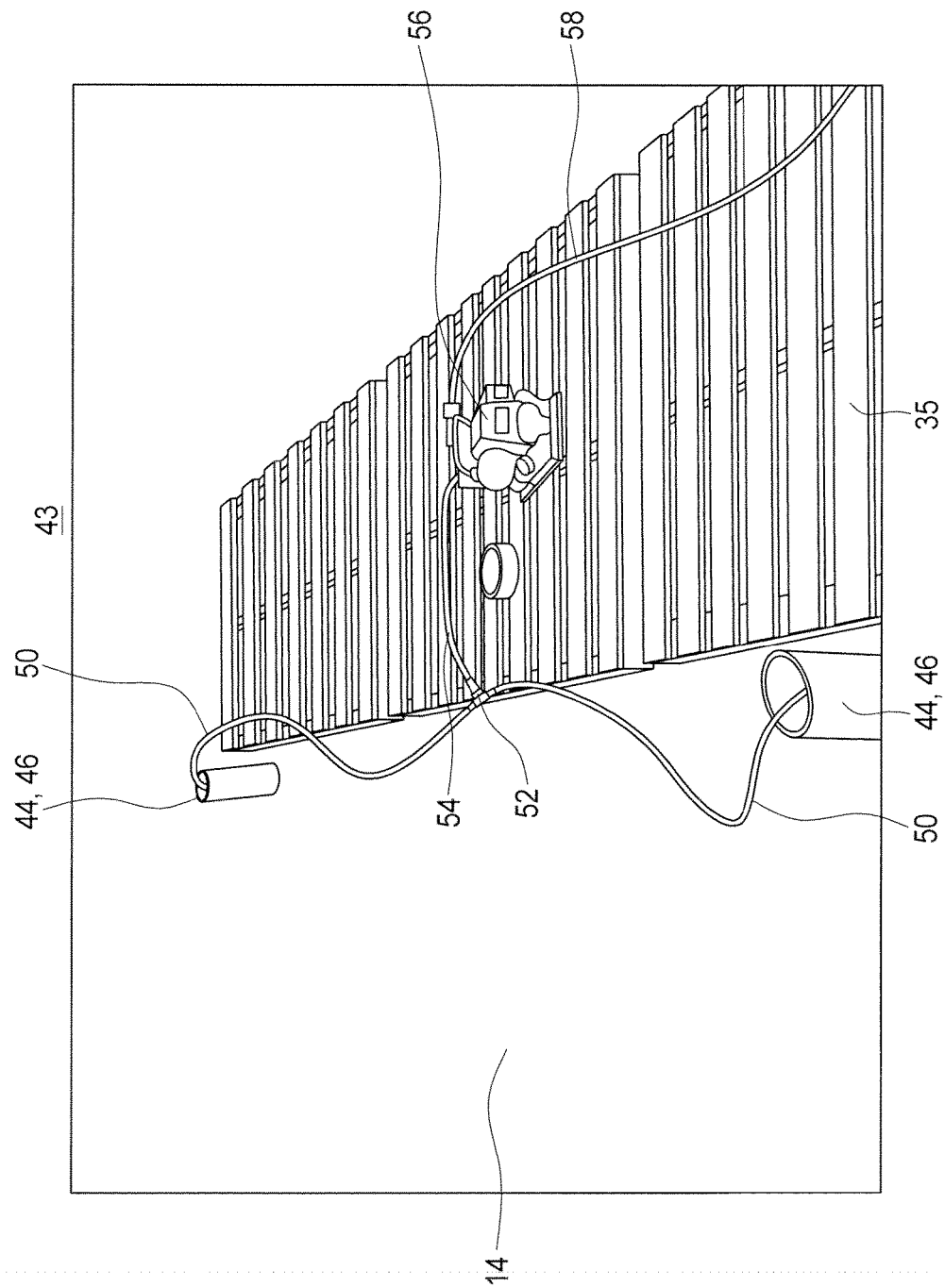
FIG. 10 is a perspective view depicting recovery wells for use with the well recovery system of FIG. 3.
Figure 11:
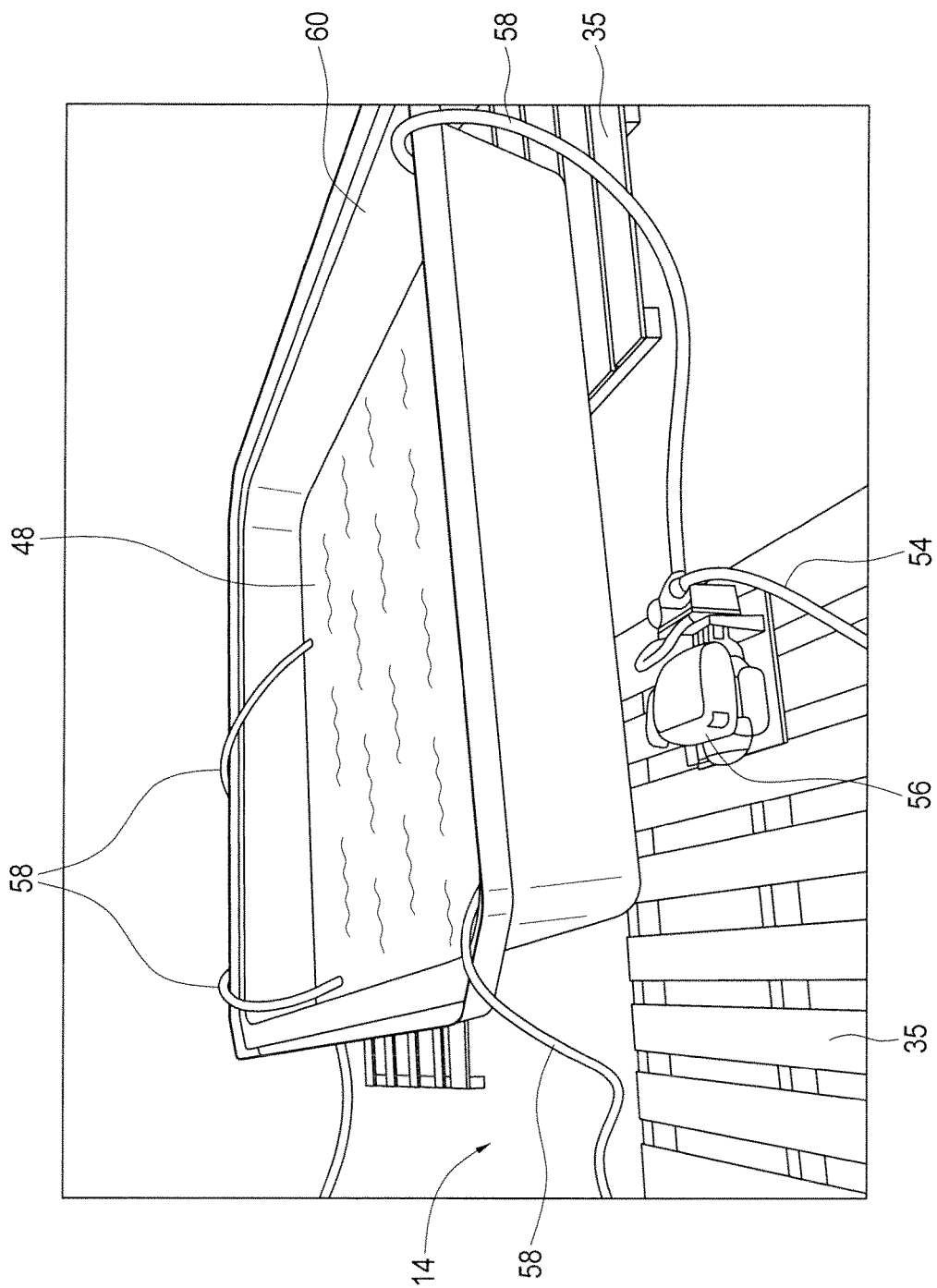
FIG. 11 is a perspective view depicting a holding tank for use with the well recovery system of FIG. 3.

Referring to FIG. 10, a representative embodiment of well recovery subsystem 43 is shown. In this figure, two well tubes 46 are shown inserted into soil 14, with hoses 50 connected to pump 56 via coupler 52 and hose 54. In this figure, a plurality of mats 58 are placed on soil 14, with pump 56 placed on one of the mats.

Field Trial Results

System 10 has been implemented at two test locations in northern Alberta, Canada. The following information represents data from one of those test locations. A spill originating from a pipeline, which released approximately 3,000 m3 of oil emulsion into a wetland.

The test location is situated in a black spruce bog with organic soil ranging in depth from 1.0 to 2.0 m. The contaminant of concern, chloride, had infiltrated the organic soils at concentrations over 11,000 mg/L. One embodiment of system 10 was installed at the site by setting up 4 manifolds, each connecting to 5 injection wells, for a total of 20 injection wells. Twenty recovery wells were also installed in strategic locations around the injection wells to create a flow through the soil which allowed the chlorides to be captured and removed from the area. The recovered chlorides can be treated with reverse osmosis or sent for disposal. The clean water used for injecting can be obtained through the treatment of contaminated water by reverse osmosis, or by obtaining clean water from a nearby source. In this example, the reverse osmosis treatment of the chloride impacted water provided a source of uncontaminated water such that minimal clean water from another source was required to initiate the system. After studying site specific conditions, the system was arranged in a grid pattern alternating row of injections wells and recovery wells. This is shown in FIG. 16, wherein a plurality of injection wells 12 were placed in a substantially linear configuration, spaced a distance of approximately 2 meters apart (shown as "d" in the figure), and wherein a plurality of recovery wells 46 were placed in a substantially linear configuration, also placed approximately 2 meters apart, where the injection wells and recovery wells were placed substantially parallel to each other and spaced approximately 5 meters apart (shown as "D" in the figure). The recovery wells can also be staggered relative to the injection wells, as shown in FIG. 16. In some embodiments, "D" can range anywhere from 1 meter to 10 meters, depending on soil conditions, the extent of contamination and the type of contaminants.

Figure 12:
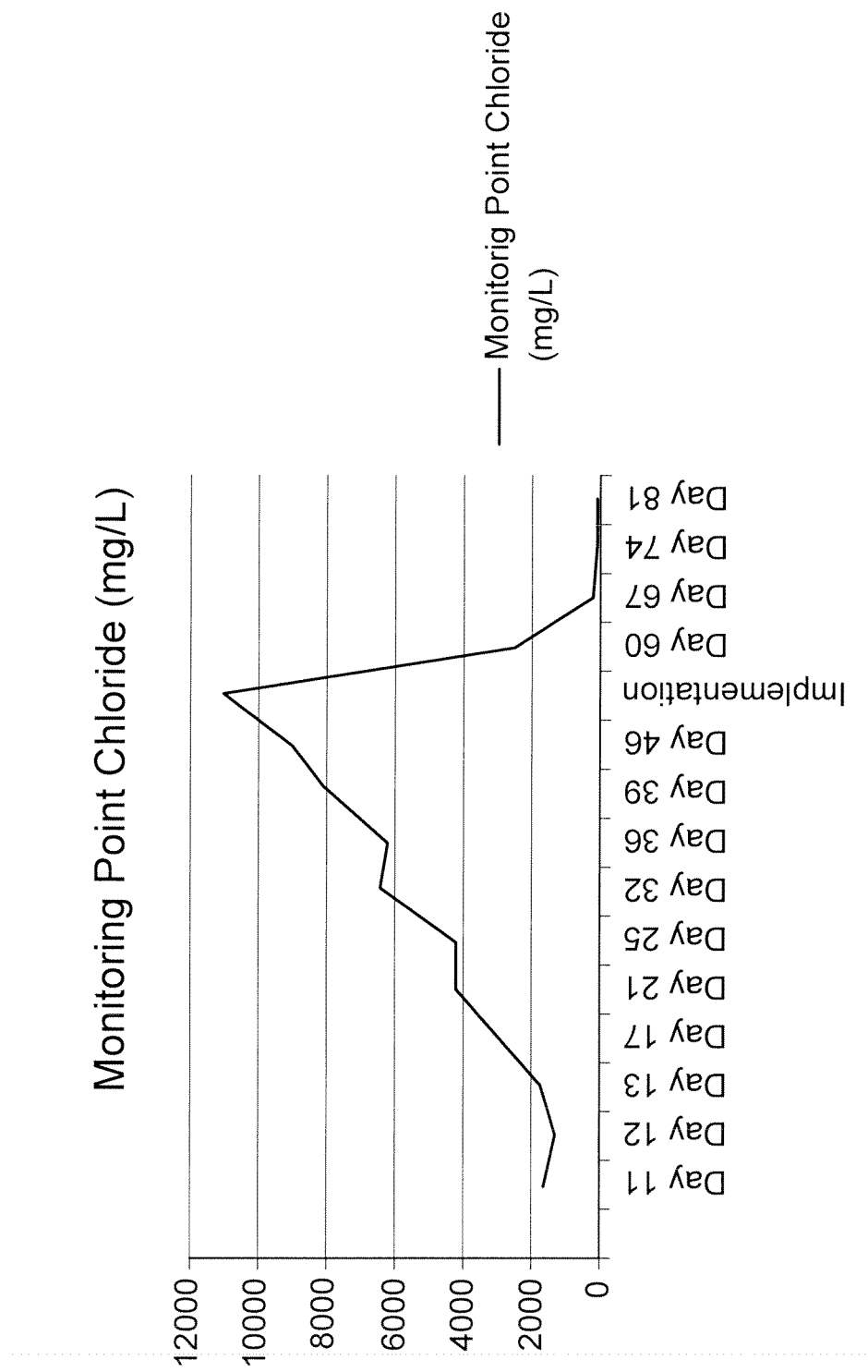
FIG. 12 is an X-Y graph depicting the concentration of chloride at a monitoring point before and after the implementation of the dissolved phase contaminant recovery system of FIG. 1.

In this field trial, a control point was used for comparison between the treatment area and a non-treatment area. During the field trial, chloride concentrations remained stable at 22,000 mg/L within the non-treatment area. After 28 days of system operations, the chloride concentration in the treatment area was reduced to 52 mg/L. This is shown in FIG. 12. This represents a 99.53% reduction in chloride concentration.

Figure 13:
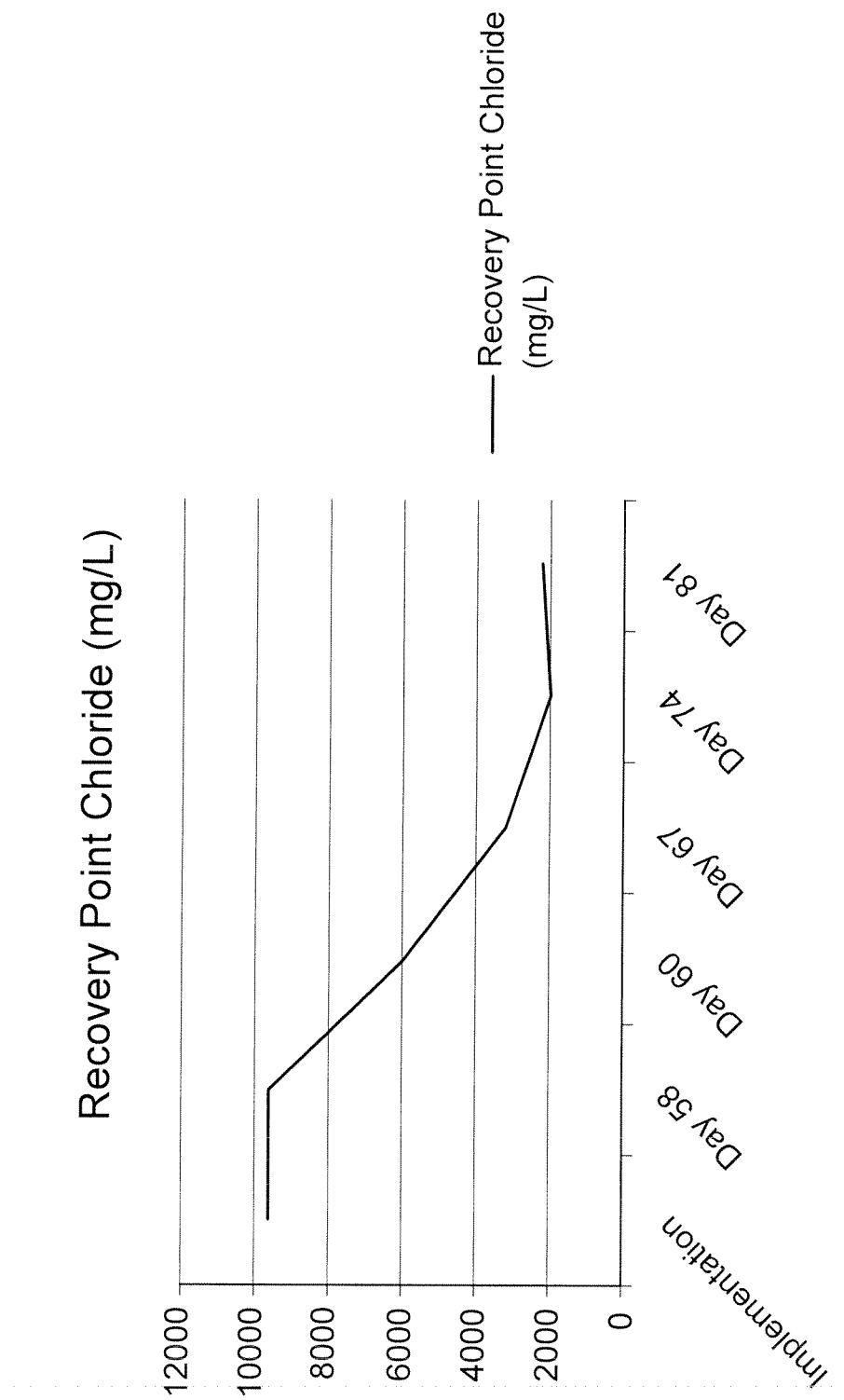
FIG. 13 is an X-Y graph depicting the concentration of chloride at a recovery point before and after the implementation of the dissolved phase contaminant recovery system of FIG. 1.

At another monitoring point, initial chloride concentrations measured 9,600 mg/L. In 28 days, the injection/recovery system has reduced the chloride in this area to 2,200 mg/L, which represents a 77% reduction in chloride concentration. This is shown in FIG. 13.

Figure 14:
FIG. 14 is a contour map depicting EM38 conductivity data of a site prior to the implementation of the dissolved phase contaminant recovery system of FIG. 1.
Figure 15:
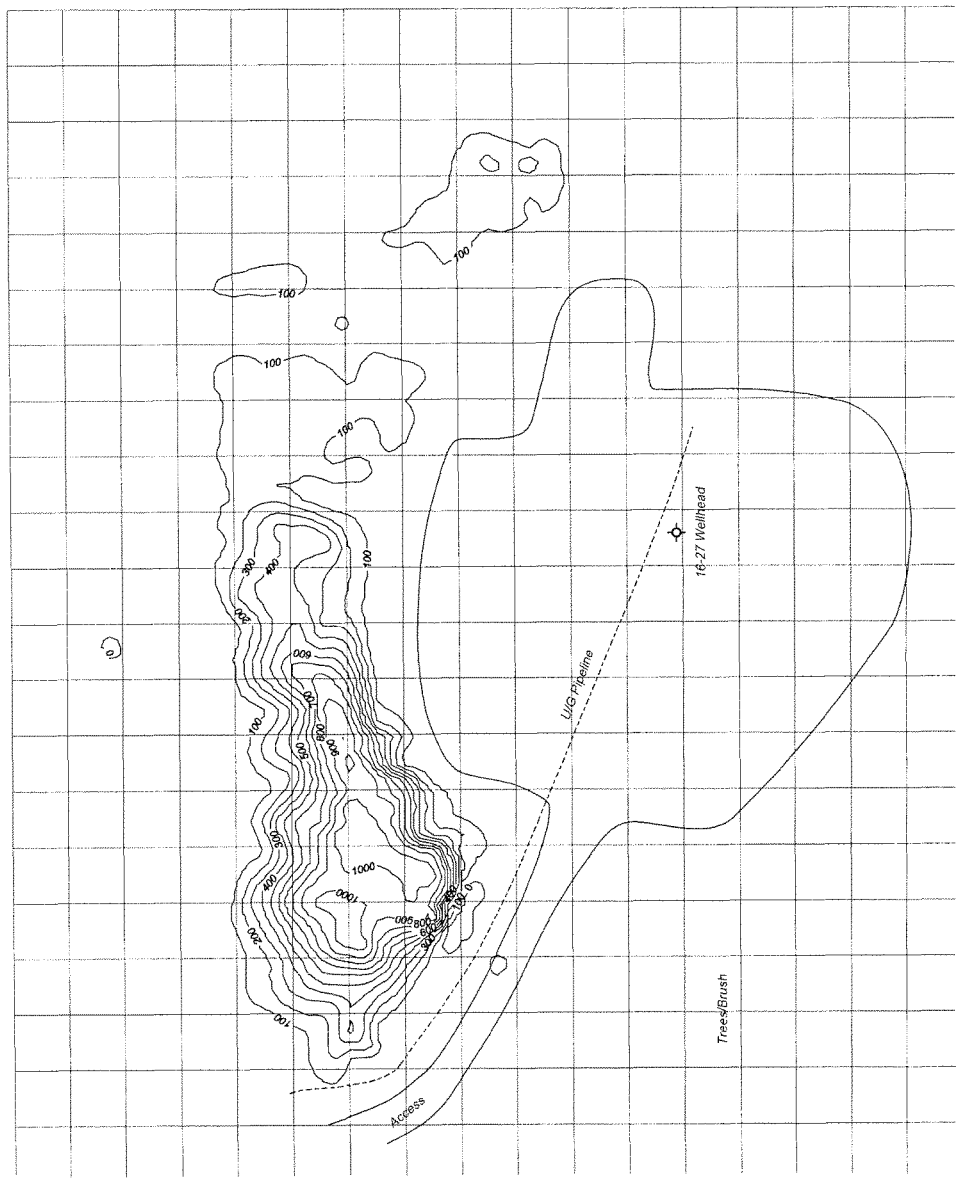
FIG. 15 is a contour map depicting EM38 conductivity data of a site after the implementation of the dissolved phase contaminant recovery system of FIG. 1.

The reduction in chloride concentration can also be represented visually on electromagnetic 38 ("EM38") surveys. The first EM38 survey was conducted on Jun. 19, 2014, prior to the set-up of the system, and is shown on FIG. 14. The second survey was conducted on Sep. 18, 2014 after the system had operated for 38 days, and is shown on FIG. 15. As chloride is highly conductive, higher concentrations generally appear as anomalies in the surrounding area. Areas of higher conductivity are represented by the contour lines on FIGS. 14 and 15. Areas having a conductivity of approximately 300 mS/m and greater coincide with elevated chlorides being present. As the chlorides were reduced through use of the system in the area, the conductivity decreased. A comparison between the two EM surveys shows a reduction in electrical conductivity of 177 mS/m.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

We claim:

1. A method for recovering dissolved phase contaminants from a layer of organic soil contaminated with the dissolved phase contaminants, the method comprising:
    a) providing dissolved phase contaminant recovery system, the system comprising:
        i) a plurality of injection wells configured to be inserted into the layer of organic soil, the plurality of injection wells configured to inject water into the layer of organic soil,
        ii) a plurality of recovery wells configured to be inserted into the layer of organic soil, the plurality of recovery wells configured to withdraw at least some dissolved phase contaminants from the layer of organic soil,
        iii) a tank configured for holding water,
        iv) a first pump operatively coupled to the tank, and configured to draw uncontaminated water disposed in the tank and to provide a source of pressurized uncontaminated water at a pressure that does not cause fracturing in the layer of organic soil, and
        v) a manifold operatively coupling the source of pressurized uncontaminated water to the plurality of injection wells;
    b) inserting at least one of the plurality of injection wells into the layer of organic soil;
    c) inserting at least one of the plurality of recovery wells into the layer of organic soil in a location proximal to the inserted at least one of the plurality of injection wells;
    d) injecting pressurized uncontaminated water into the layer of organic soil through the inserted at least one of the plurality of injection wells without fracturing the layer of organic soil; and
    e) recovering water contaminated with dissolved phase contaminants from the inserted at least one of the plurality of recovery wells.

2. The method as set forth in claim 1, wherein at least one of the plurality of injection wells comprises:
    a) a tubular probe comprising an upper end and a lower end;
    b) an upper cap disposed on the upper end and configured for enclosing the upper end;
    c) a coupler disposed on the upper cap, the coupler configured for coupling to the manifold via a hose;
    d) a pressure gauge operatively coupled to the upper cap, the pressure gauge configured for measuring pressure of the source of pressurized uncontaminated water pumped by the first water pump; and
    e) at least one screen disposed on the tubular probe, the at least one screen configured to permit the pressurized uncontaminated water pumped by the water pump to egress through the at least one screen into the layer of organic soil.

3. The method as set forth in claim 1, wherein at least one of the plurality of recovery wells comprises:
    a) a well tube comprising an open upper end and an open lower end;
    b) a collection hose having a first end and a second end, the first end disposed in the well tube and configured to draw in contaminated water comprising dissolved phase contaminants entering into the well tube;
    c) a second water pump comprising an inlet and a discharge port, the inlet operatively coupled to the first end of the collection hose, the second water pump configured for pumping the contaminated from the well tube and out the discharge port; and
    d) a holding tank configured to receive the contaminated water discharged from the discharge port of the second water pump.

4. The method as set forth in claim 2, wherein at least one of the plurality of recovery wells comprises:
    a) a well tube comprising an open upper end and an open lower end;
    b) a collection hose having a first end and a second end, the first end disposed in the well tube and configured to draw in contaminated water comprising dissolved phase contaminants entering into the well tube;
    c) a second water pump comprising an inlet and a discharge port, the inlet operatively coupled to the first end of the collection hose, the second water pump configured for pumping the contaminated water from the well tube and out the discharge port; and
    d) a holding tank configured to receive the contaminated water discharged from the discharge port of the second water pump.

5. A method for recovering dissolved phase contaminants from a geographic region comprising a layer of organic soil contaminated with the dissolved phase contaminants, the method comprising:
    a) pumping uncontaminated water from a tank to provide a source of pressurized uncontaminated water at a pressure that does not cause fracturing in the layer of organic soil;
    b) injecting the pressurized uncontaminated water through at least one injection well into the layer of organic soil in at least one first location in the region, the pressurized uncontaminated water injected into at least one first predetermined depth in the layer of organic soil; and
    c) recovering water contaminated with the dissolved phase contaminants from at least one recovery well in at least one second location in the region, the contaminated water recovered from at least one second predetermined depth in the layer of organic soil, the at least one second location proximal to the at least one first location.

* * * * *